(12) United States Patent
Houston et al.

(10) Patent No.: US 7,058,630 B2
(45) Date of Patent: Jun. 6, 2006

(54) SYSTEM AND METHOD FOR DYNAMICALLY CONTROLLING ACCESS TO A DATABASE

(75) Inventors: William M. Houston, Essex Junction, VT (US); James A. Martin, Jr., Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 10/218,128

(22) Filed: Aug. 12, 2002

(65) Prior Publication Data

US 2004/0030702 A1    Feb. 12, 2004

(51) Int. Cl.
    G06F 17/30    (2006.01)
(52) U.S. Cl. ............... 707/9; 709/229; 709/202; 707/10
(58) Field of Classification Search ............. 707/1, 707/8, 9, 10; 709/229, 202
    See application file for complete search history.

(56) References Cited

U.S. PATENT DOCUMENTS

| | | | | |
|---|---|---|---|---|
| 5,787,428 A | * | 7/1998 | Hart | 707/9 |
| 5,878,415 A | * | 3/1999 | Olds | 707/9 |
| 5,905,984 A | * | 5/1999 | Thorsen | 707/9 |
| 5,950,195 A | | 9/1999 | Stockwell et al. | 707/4 |
| 5,991,810 A | * | 11/1999 | Shapiro et al. | 709/229 |
| 6,052,688 A | * | 4/2000 | Thorsen | 707/100 |
| 6,185,684 B1 | | 2/2001 | Pravetz et al. | 713/182 |
| 6,253,217 B1 | | 6/2001 | Dourish et al. | 707/500 |
| 6,292,798 B1 | * | 9/2001 | Dockter et al. | 707/9 |
| 6,434,607 B1 | * | 8/2002 | Haverstock et al. | 709/217 |
| 6,772,167 B1 | * | 8/2004 | Snavely et al. | 707/102 |

OTHER PUBLICATIONS

Kitazawa et al., Improvement of Secure Access Control Agent for Distributed Files, Parallel Processing 1999. Proceedings. 1999 International Workshops on Sep. 21-24, 1999, pp.: 185-190.*

* cited by examiner

Primary Examiner—Greta Robinson
(74) Attorney, Agent, or Firm—Shelley M Beckstrand; William E. Schiesser

(57) ABSTRACT

A system and method for controlling access to an ACL list protected database. Each of one or more access control documents includes a start time or an end time, and a start access control list or an end access control list. An access control agent permits access to the database after the start time by reference to the start access control list and after the end time by reference to the end access control list.

3 Claims, 14 Drawing Sheets

| ACL MANAGER – ACL ALTERATION DOCUMENT – LOTUS NOTES ||||
|---|---|---|---|
| ACL MANAGER<br>○ ○ ○<br>→BY DATABASE<br>○ ○ ○ | CREATE ACL CONTROL DOC ||||
| | DATABASE NAME /44 | LAST RUN /42 | COMMENT |
| | CLIENT INFO MANAGER | | DISABLE EDITOR ACCESS DURING DAILY AGENT EXECUTION ~70 |
| | | 01/22/2001 | ENABLE EDITOR ACCESS DURING DAILY AGENT EXECUTION ~72 |
| | CUSTOMER ACCOUNT CODE MGR | 01/20/2001 | DISABLE EDITOR ACCESS DURNG DAILY AGENT EXECUTION |
| | | 01/22/2001 | ENABLE . . . ~74 |
| | ASSET INFO MANAGER | 01/20/2001 | DISABLE . . . |
| | | 01/22/2001 | ENABLE . . . ~80 |
| | ○ ○ ○ | | |

Database Properties —50

| Server | mdnetnws |
|---|---|
| Path | shared\ |
| Filename | cim.nsf |

Action Scheduling  ○ Action Enabled / ○ Action Disabled

| Days | ☐Sunday ☒Monday ☒Tuesday ☒Wednesday ☒Thursday ☒Friday ☒Saturday |
|---|---|
| Time | 07:40 PM |
| Threshold | 30 |
| Last Execution Date | |

| | Entries Affected | New Access | New Roles | Other |
|---|---|---|---|---|
| Click Here to Modify | CIM Administrators<br>CIM Deployers<br>CIM Editors<br>CIM Site Reps | Reader | | |
| Click Here to Modify | | | | |
| Click Here to Modify | | | | |
| Click Here to Modify | | | | |
| Click Here to Modify | | | | |
| Click Here to Modify | | | | |
| Click Here to Modify | | | | |

Fig. 3

Database Properties ~50

| Server | mdnetnws |
|---|---|
| Path | shared\ |
| Filename | cim.nsf |

Action Scheduling

○ Action Enabled
○ Action Disabled

| Days | ☐Sunday |
|---|---|
| | ☒Monday |
| | ☒Tuesday |
| | ☒Wednesday |
| | ☒Thursday |
| | ☒Friday |
| | ☒Saturday |
| Time | 08:15 PM |
| Threshold | 60 |
| Last Execution Date | 01/22/2001 |

| | Entries Affected | New Access | New Roles | Other |
|---|---|---|---|---|
| Click Here to Modify | CIM Administrators | Editor | [Administration] [Planning] [Deployers] [ReqCascade] | |
| Click Here to Modify | CIM Editors | Editor | [Deployers] | |
| Click Here to Modify | CIM Site Reps | Editor | [Planning] [Deployers] [ReqCascade] | |
| Click Here to Modify | CIM Deployers | Editor | [Planning] [Deployers] | |
| Click Here to Modify | | | | |
| Click Here to Modify | | | | |
| Click Here to Modify | | | | |

Fig. 4

| Database Properties | 50 |
|---|---|
| Server | mdnetnws |
| Path | shared\ |
| Filename | cacm.nsf |

45  47

Action Scheduling  52    ● Action Enabled   58
                        ○ Action Disabled

| Days | ☐ Sunday |
| | ☒ Monday |
| | ☒ Tuesday |
| | ☒ Wednesday |
| | ☒ Thursday |
| | ☒ Friday |
| | ☒ Saturday |
| Time | 07:40 PM |
| Threshold | 30 |
| Last Execution Date | 01/20/2001 |

54  56

43

| | Entries Affected | New Access | New Roles | Other |
|---|---|---|---|---|
| Click Here to Modify | CACM Administrators CACM Editors | Reader | | |
| Click Here to Modify | | | | |
| Click Here to Modify | | | | |
| Click Here to Modify | | | | |
| Click Here to Modify | | | | |
| Click Here to Modify | | | | |
| Click Here to Modify | | | | |

| Database Properties | ~50 | | | |
|---|---|---|---|---|
| Server | mdnetnws | | | |
| Path | shared\ | | | |
| Filename | cacm.nsf | | | |

| Action Scheduling | ● Action Enabled  ○ Action Disabled | | | |
|---|---|---|---|---|
| Days | ☐ Sunday  ☒ Monday  ☒ Tuesday  ☒ Wednesday  ☒ Thursday  ☒ Friday  ☒ Saturday | | | |
| Time | 8:15 PM | | | |
| Threshold | 60 | | | |
| Last Execution Date | 01/22/2001 | | | |

| | Entries Affected | New Access | New Roles | Other |
|---|---|---|---|---|
| Click Here to Modify | CACM Administrators  CACM Editors | Editor | [Administration] | |
| Click Here to Modify | | | | |
| Click Here to Modify | | | | |
| Click Here to Modify | | | | |
| Click Here to Modify | | | | |
| Click Here to Modify | | | | |
| Click Here to Modify | | | | |

Fig. 6

Database Properties ~50

| Server | |
|---|---|
| Path | |
| Filename | test |

~45 ~47

Action Scheduling ~52  ● Action Enabled  
○ Action Disabled ~58

| Days | ☐ Sunday ☐ Monday ☒ Tuesday ☐ Wednesday ☐ Thursday ☐ Friday ☐ Saturday | |
|---|---|---|
| Time | 11:30 PM | |
| Threshold | 60 | |
| Last Execution Date | 01/16/2001 | |

~54 ~56 ~43

| | Entries Affected | New Access | New Roles | Other |
|---|---|---|---|---|
| | ~60 | ~62 | ~64 | ~66 |
| Click Here to Modify | Bob The Man | Manager | [testrole1] [testrole2] [testrole3] [testrole4] [testrole5] [testrole6] | X |
| Click Here to Modify | Betty Davis/Burlington/IBM | Depositor | [testrole4] | X |
| Click Here to Modify | | | | |
| Click Here to Modify | LocalDomainServers | No access | [testrole1] [testrole2] [testrole3] [testrole4] [testrole5] [testrole6] | X |
| Click Here to Modify | | | | |
| Click Here to Modify | | | | |
| Click Here to Modify | | | | |

Fig. 7  ~78

| Database Properties | 50 |
|---|---|
| Server | tgy2k2 |
| Path | |
| Filename | tgaim.nsf |

Action Scheduling  ● Action Enabled
　　　　　　　　　　○ Action Disabled

| Days | ☐ Sunday |
| | ☒ Monday |
| | ☒ Tuesday |
| | ☒ Wednesday |
| | ☒ Thursday |
| | ☒ Friday |
| | ☒ Saturday |
| Time | 07:40 PM |
| Threshold | 30 |
| Last Execution Date | 01/20/2001 |

| | Entries Affected | New Access | New Roles | Other |
|---|---|---|---|---|
| Click Here to Modify | WLM Administrators<br>WLM Transfers | Reader | | |
| Click Here to Modify | | | | |
| Click Here to Modify | | | | |
| Click Here to Modify | | | | |
| Click Here to Modify | | | | |
| Click Here to Modify | | | | |
| Click Here to Modify | | | | |

Fig. 8

Database Properties ~50

| Server | tgy2k2 |
|---|---|
| Path | |
| Filename | tgaim.nsf |

~45 ~47

Action Scheduling ~52  ● Action Enabled  ~58
○ Action Disabled

| Days | ☐ Sunday |
| | ☒ Monday |
| | ☒ Tuesday |
| | ☒ Wednesday |
| | ☒ Thursday |
| | ☒ Friday |
| | ☒ Saturday |
| Time ~54 ~56 | 08:15 AM |
| Threshold | 60 |
| Last Execution Date ~43 | 01/22/2001 |

| | Entries Affected ~60 | New Access ~62 | New Roles ~64 | Other ~66 |
|---|---|---|---|---|
| Click Here to Modify | WLM Administrators | Editor | [PCFDBAdmins] [PCFDBReaders] [Transfers] | X |
| Click Here to Modify | WLM Transfers | Editor | [PCFDBReaders] [Transfers] | X |
| Click Here to Modify | | | | |
| Click Here to Modify | | | | |
| Click Here to Modify | | | | |
| Click Here to Modify | | | | |
| Click Here to Modify | | | | |

Fig. 9  ~82

| Database Properties | |
|---|---|
| Server | mddev0 |
| Path | btv\houston\ |
| Filename | tgwpdm.nsf |

Action Scheduling — ● Action Enabled / ○ Action Disabled

| Days | ☐ Sunday<br>☒ Monday<br>☒ Tuesday<br>☒ Wednesday<br>☒ Thursday<br>☒ Friday<br>☒ Saturday |
|---|---|
| Time | 07:40 PM |
| Threshold | 30 |
| Last Execution Date | 01/20/2001 |

| | Entries Affected | New Access | New Roles | Other |
|---|---|---|---|---|
| Click Here to Modify | WLM BA Representatives<br>WLM Delivery Project Executives<br>WLM IT Representatives<br>WLM Administrators | Reader | | |
| Click Here to Modify | | | | |
| Click Here to Modify | | | | |
| Click Here to Modify | | | | |
| Click Here to Modify | | | | |
| Click Here to Modify | | | | |
| Click Here to Modify | | | | |

Fig. 10

| Database Properties | -50 |
|---|---|
| Server | mddev0 |
| Path | btv\houston\ |
| Filename | tgwpdm.nsf |

Action Scheduling

● Action Enabled
○ Action Disabled

| Days | ☐ Sunday |
| | ☒ Monday |
| | ☒ Tuesday |
| | ☒ Wednesday |
| | ☒ Thursday |
| | ☒ Friday |
| | ☒ Saturday |
| Time | 08:15 AM |
| Threshold | 60 |
| Last Execution Date | 01/22/2001 |

| | Entries Affected | New Access | New Roles | Other |
|---|---|---|---|---|
| Click Here to Modify | WLM BA Representatives<br>WLM Delivery Project Executives<br>WLM IT Representatives | Editor | | |
| Click Here to Modify | WLM Administrators | Editor | [WPDMAdmins] | x |
| Click Here to Modify | | | | |
| Click Here to Modify | | | | |
| Click Here to Modify | | | | |
| Click Here to Modify | | | | |
| Click Here to Modify | | | | |

Delete documents

Fig. 11

ACCESS CONTROL LIST

PEOPLE, SERVERS, GROUPS [SHOW ALL ▼]  USER TYPE:

- DEFAULT
- → EMM ADMIN
- EMM READERS
- EMM TEAM
- EMM DB MGRS
- EMM NETWORKING
- EMM SUPPORT
- SOULUTIONS SUPPORT

[PERSON GROUP ▼]

ACCESS:
[AUTHOR ▼]

[ADD]   [RENAME]
[REMOVE]

☑ CREATE DOCS

☐ DELETE DOCS

☐ CREATE AGENTS

☐ CREATE FOLDERS/ VIEWS

☑ WRITE PUBLIC DOCS

ROLES:

- ✓ [MASS UPDATE]
- ✓ [NETWORKING]
- ✓ [RECORD CREATION]

[OK]   [CANCEL]   [HELP]

FIG. 12

SYSTEM AND METHOD FOR DYNAMICALLY CONTROLLING ACCESS TO A DATABASE

BACKGROUND OF THE INVENTION

1. Technical Field of the Invention

This invention relates to computer databases. More particularly, it relates to controlling access to a database by agents and end-users.

2. Background Art

Many Lotus Domino database applications have both high end-user usage, often across multiple time zones, as well as high agent usage—that is, modifications to the data by scheduled programs. A database or application typically includes documents, data elements (fields), agents and access control lists (ACL's). Agents update data elements in one or more documents and may be invoked by an end user. Scheduled agents update data elements in one or more documents automatically without the need for invocation by an end user. ACL's control the degree to which an end user or an agent may access a database Concurrent updating of documents by both end-user and agent can result in save conflicts, replication conflicts and other unpredictable results.

Problems occur when end-users, agents, and/or replication processes simultaneously access a database. These include replication conflicts and save conflicts resulting in the updates of one or more parties being lost. An example of these problems involves the high volume off-shift updating of documents, where it is desirable to temporarily revoke end user edit access until the bulk updates are completed in order to avoid inadvertent updates of the same document. The resulting conflict documents, depending on how they are handled by the database administrator or follow on agents, could result in loss of data, duplicate documents or both. Thus, there is a need in the art for an improved system and method for minimizing or entirely eliminating replication and/or save conflicts.

It is an object of the invention to provide an improved system for controlling access to a computer databases.

SUMMARY OF THE INVENTION

System and method for dynamically controlling access to a database. An access control agent uses one or more access control documents for the database, each document having a start time and/or an end time, and a start access control list and/or an end access control list. The agent permits access to the database after the start time only by those on the start access control list and after the stop time only by those on the end access control list.

In accordance with an aspect of the invention, there is provided a computer program product configured to be operable to dynamically control access to a database by instantiating an access control agent which references an access control document to permit access to the database after a start time only by those on a start access control list and after a stop time only by those on an end access control list.

Other features and advantages of this invention will become apparent from the following detailed description of the presently preferred embodiment of the invention, taken in conjunction with the accompanying drawings.

BRIEF DESCRIPTION OF THE DRAWINGS

FIG. 2 illustrates the graphical user interface (GUI) for the ACL manager of FIG. 1.

FIG. 3 illustrates an exemplary access control list document for disabling editor access to file cim.nsf during daily agent execution.

FIG. 4 illustrates an exemplary access control list document for enabling editor access to file cim.nsf during daily agent execution.

FIG. 5 illustrates an exemplary access control list document for disabling editor access to file cacm.nsf during daily agent execution.

FIG. 6 illustrates an exemplary access control list document for enabling editor access to file cacm.nsf during daily agent execution.

FIG. 7 illustrates an exemplary access control list document for selectively enabling scheduled access levels and roles.

FIG. 8 illustrates an exemplary access control list document for disabling editor access to file tgaim.nsf during daily agent execution.

FIG. 9 illustrates an exemplary access control list document for enabling editor access to file tgaim.nsf during daily agent execution.

FIG. 10 illustrates an exemplary access control list document for disabling editor access to file tgwpdm.nsf during daily agent execution.

FIG. 11 illustrates an exemplary access control list document for enabling editor access to file tgwpdm.nsf during daily agent execution.

FIG. 12 illustrates an access control list.

DETAILED DESCRIPTION OF PREFERRED EMBODIMENTS

Figure 1:
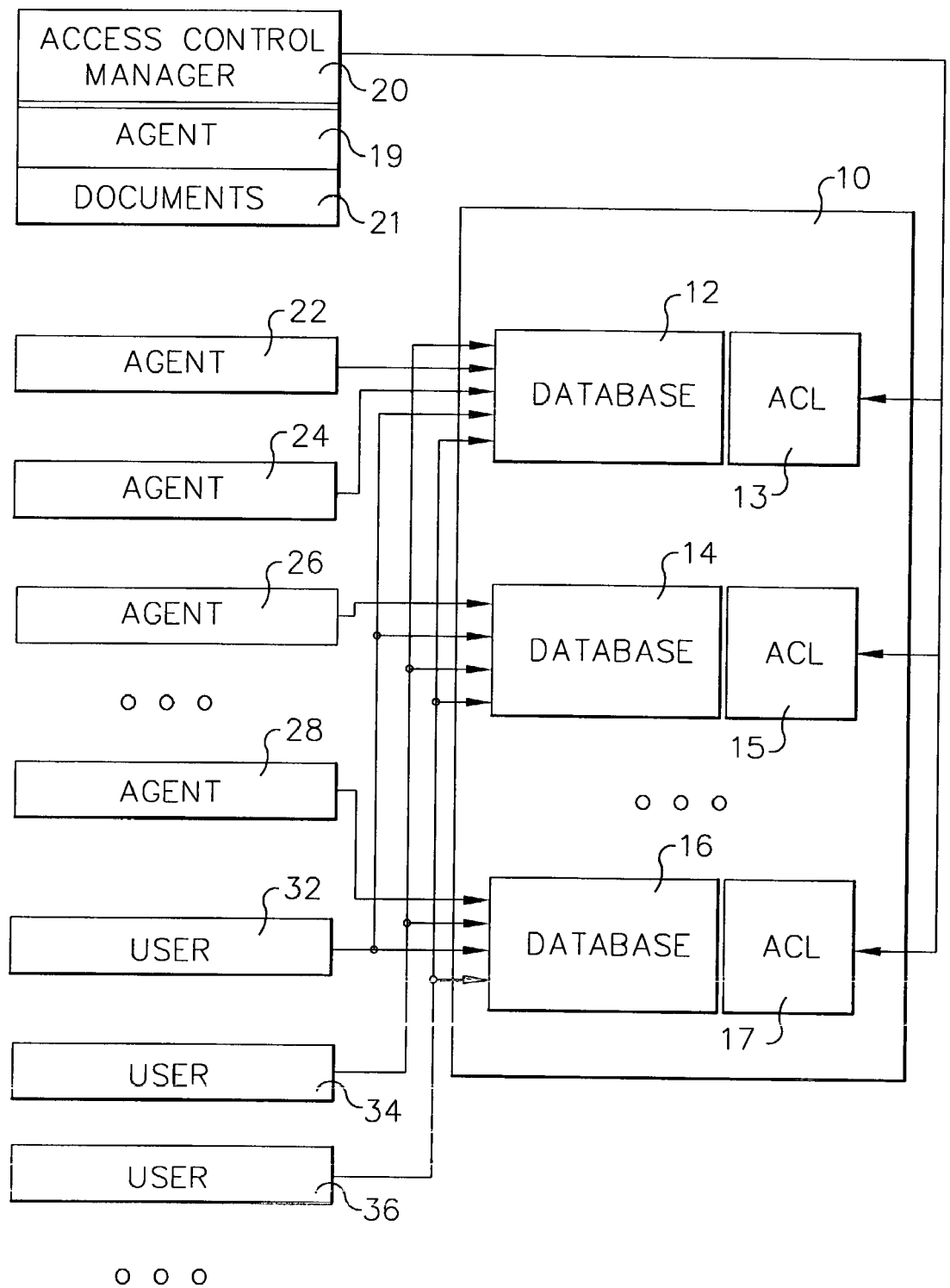
FIG. 1 is a high level system diagram illustrating a preferred embodiment of the invention for controlling access to a database.

Referring to FIG. 1, a preferred embodiment of the invention provides a system and method for automatically enforcing a strict window of read-only end-user access to databases while selected agents are executing. In an exemplary embodiment, an access control list (ACL) manager selectively revokes and restores update access to a database in a scheduled manner to minimize if not eliminate entirely replication and/or save conflicts.

Data store 10 including a plurality of databases 12, 14, 16 on one or more devices. Associated with each database is an access control list (ACL) 13, 15, 17, respectively, residing on the same or another device. The system also includes an access control list (ACL) manager 20, a plurality of process agents 22, 24, 26, 28, and a plurality of users 32, 34, 36. Access control manager 20 includes access control manager agent 19 and access control documents 21. As illustrated, by way of example, processing agents 22 and 24 access database 12, agent 26 accesses database 14, and agent 28 access database 16. Users 32, 34, and 36 each desire access to all databases within data store 10. An access control list 13 lists users, groups of users, servers, groups of servers, and roles authorized to access a given database, together with their respective levels of authorization, such levels including "no access", "despositor", "reader", "author", "editor", "designer", and "manager".

In operation, ACL manager 20 suspends edit access for all specified ACL 13, 15, 17 entries at start of agent 22–28 processing, restores edit access for all specified ACL 13, 15, 17 entries at end of agent processing, and contains control documents 21, 70–84 which specify start and end times 54 and lists of start and end affected ACL entries 60. ACL manager 20 contains an agent 19 and documents 21 (documents 70–86, FIGS. 3–11) which specify which ACL 13, 15, 17 entries 60 for which databases 12, 14, 16 are to be relegated to read only access, what their normal level of authority is, and the start and end times 54 for the relegation. This agent 19 uses one or more access control documents 21 for the databases 12, 14, 16, each document 21 having a start time or an end time 54, a start access control list or an end access control list 47. Agent 19 permits access to database 12, for example, after the start time only by those agents 22 and users 32, 34, 36 on a start access control list 13 and after the stop time only by those agents 22 and users 32, 34, 36 on an end access control list 13. This agent 19 residing within ACL manager 20 modifies the access control list (ACL) 13, 15, 17 for a given database 12, 14, 16, respectively, in accordance with the database ACL manager document 21 (documents 70–84, FIGS. 4–11).

FIG. 2 illustrates the graphical user interface (GUI) 40 for ACL manager 20 of FIG. 1. In this FIG. 2, the "last run" column 42 corresponds to the "last execution date" 43 of subsequent FIGS. 3–11, and the "database name" column 44 corresponds to the "path/file name" 45/47 in subsequent FIGS. 3–11. Database 44 is the one of databases 10 identified by path 45 and filename 47, such as database 12, 14, or 16.

FIGS. 3 through 11 illustrate access control manager documents (also referred to as access control list documents 21), and FIG. 12 illustrates an access control list. Access control manager documents 21 (including 70–86) specify how an access control list 13, 15, 17 is modified by processing agent 20.

FIG. 3 illustrates an exemplary access control manager document 70 (which is one of documents 21, as are also documents 72–86 described hereafter) for disabling editor access to file 47 cim.nsf during daily agent execution.

Server 50 represents the server version of a database management system, such as DB2, Domino, Oracle, Sybase, and so forth.

Path 45 and filename 47 define the location of a database on the server, and are used by agent 19 to know precisely which database or database application 12, 14, 16 needs to have its ACL 13, 15, 17 modified in accordance with access control documents 21.

Action specification 58 is set to action enabled or action disabled. Action 58 refers to the processing specified by this document 21 for ACL entries affected 60. An action performs the access control modification. Whether it be temporarily revoking or altering normal access or restoring normal access. Thus, there will always be two complementary actions for a given database and aCL: one to revoke and/or alter normal access and one to restore it. They are both enabled while they are required and may be deleted outright if they are no longer needed or temporarily disabled until they are needed again.

Days 52 and time 54 specify the day and time in a first document 21 for revoking access by document 21 to perform the actions specified on entries affected 60, and in a later document 21 for restoring original access by agent 19 to ACL's 13, 15, 17, etc.

Threshold 56 specifies the amount of time a processing agent 22–28 should run while attending to a specific action.

Last execution date 43 refers to the date when processing agent 22–28 last performed its action.

Entries affected 60 lists the person or group entries in the access control list which are affected by an action.

New access 62 specifies the new access control level for the corresponding entries in entries affected 60.

New roles 64 specifies the new roles for the corresponding entries in entries affected 60.

Other 66 specifies other ACL elements affected, such as the ability to run agents, create private views, create documents, delete documents, and so forth.

FIG. 4 illustrates an exemplary access control manager document 72 for enabling editor access to file 47 cim.nsf during daily agent execution. In this case, administrators, editors, site reps and deployers 60 are given editor access 62 with respect to cim.nsf 47 on server mdnetnws 50, administrators are given administration, planning, deployers, and reqcascade roles 64, editors are given deployers role 64, site reps are given planning, deployers, and reqcascade roles, and deployers are given planning and deployers roles.

FIG. 5 illustrates an exemplary access control manager document 74 for disabling editor access to file 47 cacm.nsf during daily agent execution. In this case, administrators and editors 60 are given reader access 62.

FIG. 6 illustrates an exemplary access control manager document 76 for enabling editor access to file cacm.nsf during daily agent execution. In this case, administrators and editors are given editor access and administration roles.

FIG. 7 illustrates an exemplary access control manager document 78 for enabling delete documents, write public documents, and read public documents access to file test. In this case ACL entry Bob The Man is given manager access 62, new roles 64 testrole1 through testrole6 and some other 66 characteristic "x", including delete documents; write public documents; read public documents; write public documents 78. Characteristic "x" refers to other elements (beyond access level and roles) of an ACL, such as ACL 13, that may be modified by ACL manager 20. The complete list of such elements includes: create documents; delete documents; create personal agents; create personal folders/views; create shared folders/views; create LotusScript/Java agents; read public documents; create public documents.

FIG. 8 illustrates an exemplary access control manager document 80 for disabling editor access to file tgaim.nsf during daily (Monday through Saturday, starting at time 54 07:40 PM for threshold 56 30 minutes ) agent execution. Administrators and transfers are provided reader access.

FIG. 9 illustrates an exemplary access control manager document 82 for enabling editor access to file tgaim.nsf during daily agent execution. Administrators are given editor access, and roles PCFDBAdmins, PCFDBReaders, and Transfers; transfers are given editor access 62 and roles 64 PCFDBReaders and transfers; and both administrators and transfers are given other 66, which includes create personal folders/views; create shared folders/views; create personal folders/views. The complete list of such elements includes: create documents; delete documents; create personal agents; create personal folders/views; create shared folders/views; create LotusScript/Java agents; read public documents; create public documents.

FIG. 10 illustrates an exemplary access control manager document 84 for disabling editor access to file tgwpdm.nsf during daily agent execution. In this example, BA representatives, delivery project executives, IT representatives, and administrators are given reader access 62.

FIG. 11 illustrates an exemplary access control manager document 86 for enabling editor access to file tgwpdm.nsf during daily agent execution. BA representatives, delivery project executives, IT representatives and administrators are given editor access 62, and administrators 60 are given new role 64 of WPDMAdmins and other 66 of "delete documents".

FIG. 12 illustrates selected portions of an access control list. Such a list 88 includes a drop down list 92 for selecting for viewing in window 94 people, servers, and/or groups—in this example, all; user type drop down list 102, access drop down list 104, access type list 106, and roles list 108. OK, cancel and help buttons are also provided. An access control manager document 70–86 determines how an access control list 88 is modified by processing agent 19 in accordance with an exemplary embodiment of the present invention.

In a further exemplary embodiment of the invention, a user 32 is provided an existing session which gives him rights that override ACL manager 20. This is handled by a scheduled server program document 21 which does a 'drop all' that runs immediately preceding the ACL modifier 21. An alternative embodiment would do selective drops of people with author access or greater. A program document residing on a server outside of a database application may perform server wide operations such as dropping users from accessing a database or server.

Figure 13A:
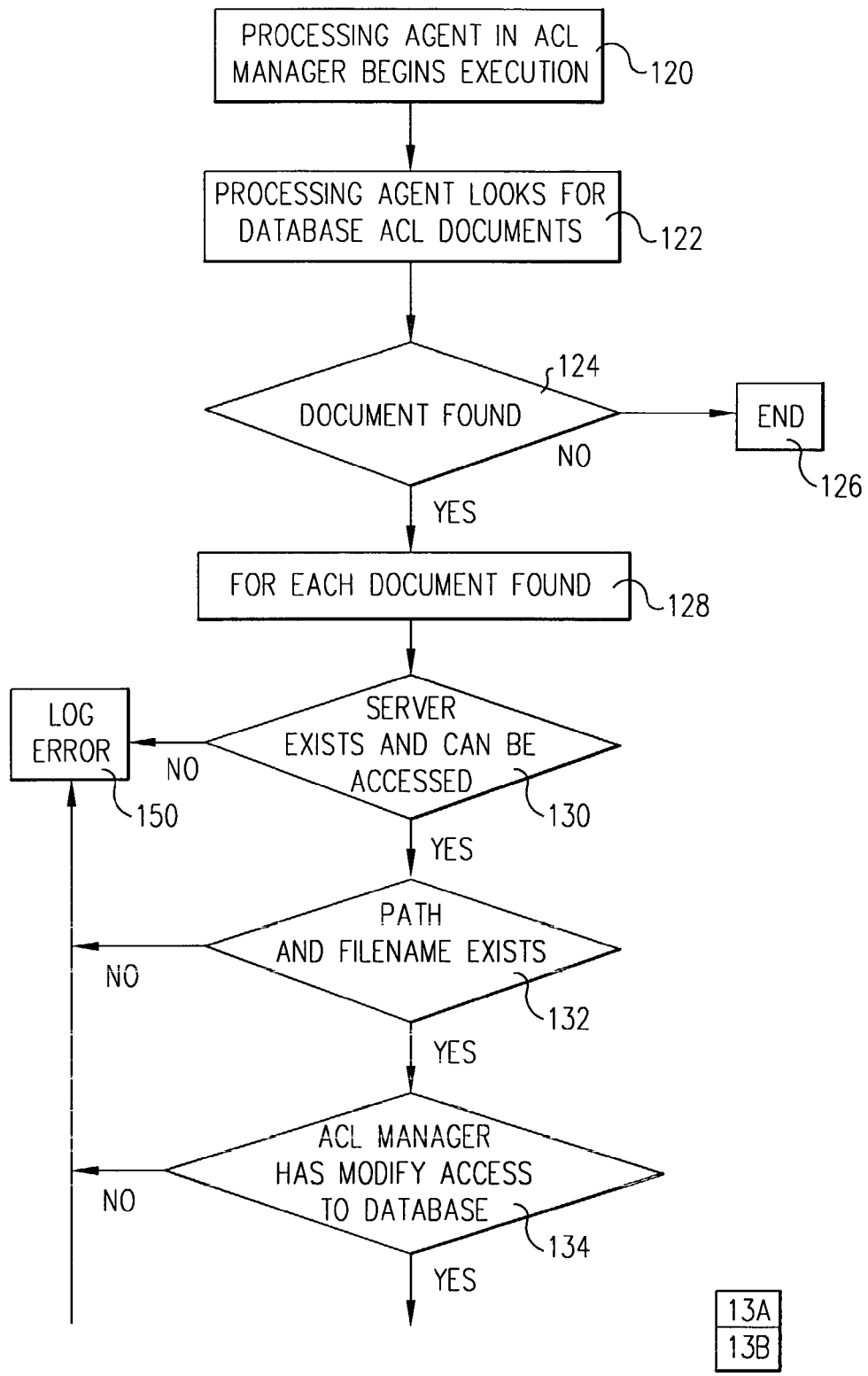
FIGS. 13A and 13B are a flow chart representation of an exemplary embodiment of the method of the invention.
Figure 13B:
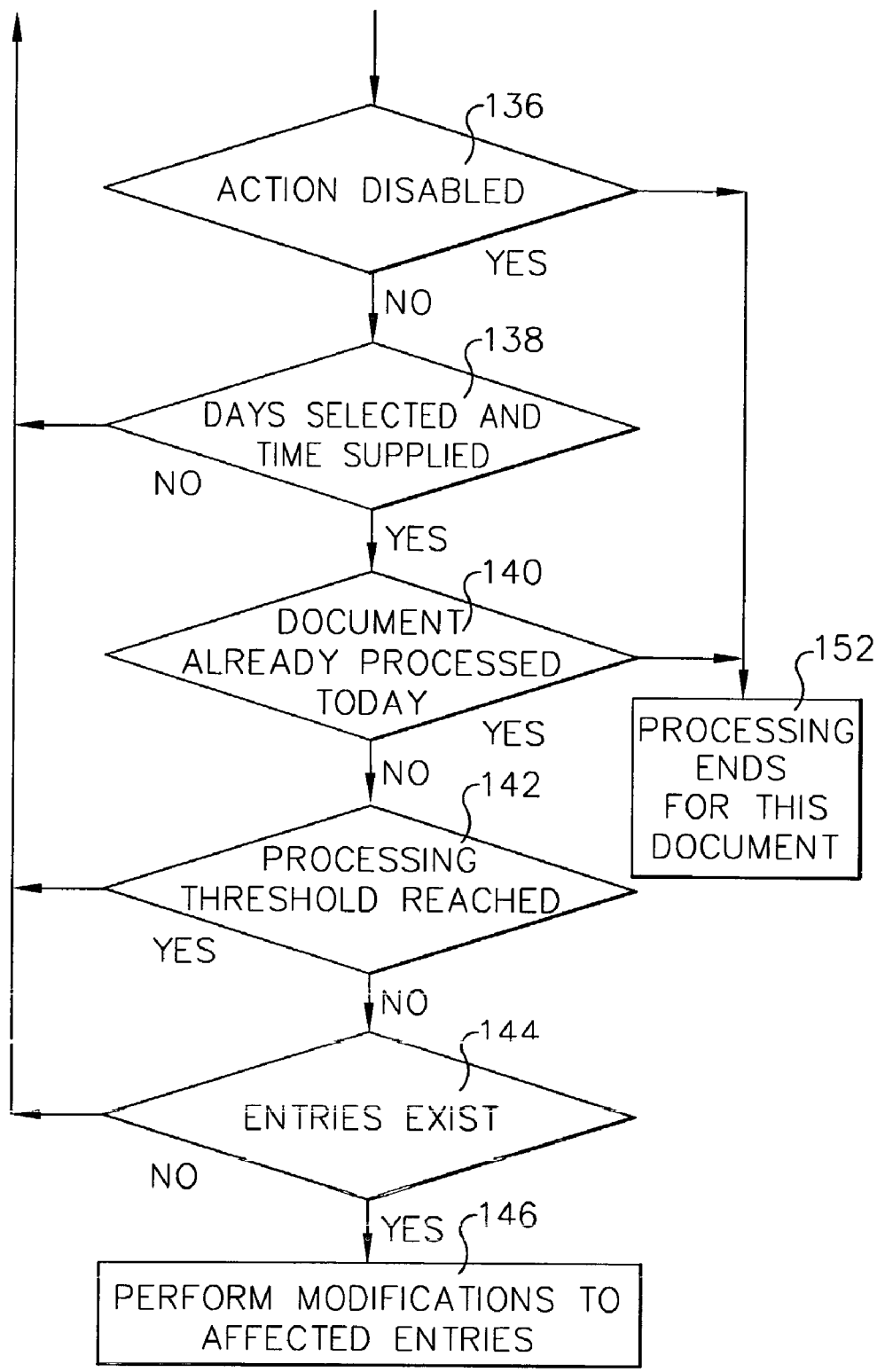

Referring to FIGS. 13A and 13B, an exemplary embodiment of the method of the invention is set forth.

In step 120, processing agent 19 in ACL manager 20 begins execution, and in step 120 looks for database ACL documents 21. If none are found in step 124, in step 126 processing ends; else, in step 128, processing continues for each document 21 found.

In step 130, if server 50 cannot be found (does not exist or cannot be accessed), in step 150 an error is logged and processing continues to the next document 21 found in step 122. Similarly, an error is logged in step 150 and processing continues to the next document 21 found in step 122 if in step 132 path 45 and filename 47 to a database 12 (or 14, 16, etc.) do not exist for this document 21; or in step 134 if ACL manager 20 does not have sufficient access to the database identified by path 45 and filename 47 to perform the ACL modifications specified by new access 62, new roles 64, and other 66 specifications of this document 21; or in step 138 if no days 52 are selected or no time 54 is specified; or in step 142 if processing threshold 56 is reached; or in step 144 no affected entries 60 exist. In step 136, if action 58 is set to disabled, then in step 152 processing ends for this document. In step 140, if this document 21 has already been processed today, then in step 152 processing ends for this document. Otherwise, in step 146 all modifications 62, 64, 66 for all entries 60 of document 21 are performed on the addressed ACL 13, 15, or 17, etc., and processing continues to the next document 21 until all documents have been processed and processing ends in step 126.

ADVANTAGE OVER THE PRIOR ART

It is an advantage of the invention that there is provided an improved system and method for controlling access to a computer database.

It is an advantage of the invention that there is provided a system and method for controlling access to a computer database by agents and applications.

It is an advantage of the invention that there is provided a system and method for automatically and temporally controlling access to a computer database by agents and applications.

It is an advantage of the invention that there is provided a system and method for temporally adjusting ACL lists referenced for authorizing or controlling access to a computer database.

It is a further advantage of the invention that there is provided a system and method for temporarily adjust ACL lists referenced by agents and users for authorizing or controlling access to a computer database, and the documents and data elements therein.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as IBM Systems designated as zSeries, iSeries, xSeries, and pSeries, or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method for controlling access to a database, comprising:
    providing a database;
    providing an access control manager application including a plurality of access control documents for selectively changing and later restoring security access levels to said database;
    providing an access control agent specific to a given database;
    providing a first of said access control documents for said given database specifying a Btart time and a start access control list;
    providing a second of said access control documents for said given database specifying an end time and an end access control list;
    scheduling said access control agent to permit access to said database after said start time by reference to said start access control list and after said end time by reference to said end access control list;
    operation said agent responsive to said access control documents to modify said access control list for controlling processing agent and user access to database documents and data elements within said database documents by automatically enforcing a strict window of read-only end-user access to said database while selected agents are executing;
    said access control documents further specifying a server, an address of a database, action indicia, days selected indicia, time indicia, threshold indicia, affected access control list entries, and new access specifications and new roles specifications corresponding to said affected access control list entries; and operating said agent to identify any database access control documents, and for each said database access control document found:
  logging an error responsive to said server not being accessible, said address not being accessible, said agent not having modify access to the access control list of said database, said days selected indicia not being specified, said time indicia not being specified, said threshold indicia being reached, or said access control list entries affected list being null; and otherwise
  executing said new access specifications and new roles specifications with respect to said corresponding affected access control list entries.

2. A system for controlling access to a database, comprising:
  a database;
  an access control list for controlling access to said database by automatically enforcing a strict window of read-only end-user access to said database while selected agents are executing;
  an access control agent;
  an access control manager application including a plurality of access control documents for said database, a first of said access control documents specifying a start time and a start access control list modification action, and a second of said access control documents specifying an end time and an end access control list modification action;
  said agent operable at said start time to modify said access control list by reference to said start access control list modification action and after said end time by reference to said end access control list modification action;
  said access control documents further specifying a server, an address of a database, action indicia, days selected indicia, time indicia, threshold indicia, affected access control list entries, and new access specifications and new roles specifications corresponding to said affected access control list entries;
  said agent being operable for identifying any database access control documents, and for each said database access control document found:
    logging an error responsive to said server not being accessible, said address not being accessible, said agent not having modify access to the access control list of said database, said days selected indicia not being specified, said time indicia not being specified, said threshold indicia being reached, or said access control list entries affected list being null; and otherwise
    executing said new access specifications and new roles specifications with respect to said corresponding affected access control list entries.

3. A program storage device readable by a machine, tangibly embodying a program of instructions executable by a machine to perform method steps for controlling access to a database, said method comprising:
  providing a database with security levels for accessing said database specified by an access control list;
  providing an access control agent;
  providing a plurality of access control documents for said database, with a first document specifying a start time and a start access control list modification action, and a second document specifying an end time and an end access control list modification action;
  operating said agent to modify said access control list to permit access to said database after said start time by reference to said start access control list modification action and after said end time by reference to said end access control list modification action;
  said access control documents further specifying a server, an address of a database, action indicia, days selected indicia, time indicia, threshold indicia, affected access control list entries, and new access specifications and new roles specifications corresponding to said affected access control list entries;
  operating said agent to identify any database access control documents, and for each said database access control document found:
    logging an error responsive to said server not being accessible, said address not being accessible, said agent not having modify access to the access control list of said database, said days selected indicia not being specified, said time indicia not being specified, said threshold indicia being reached, or said access control list entries affected list being null; and otherwise
    executing said new access specifications and new roles specifications with respect to said corresponding affected access control list entries.

* * * * *